United States Patent
Speight et al.

(10) Patent No.: US 8,612,691 B2
(45) Date of Patent: *Dec. 17, 2013

(54) ASSIGNING MEMORY TO ON-CHIP COHERENCE DOMAINS

(75) Inventors: William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,814

(22) Filed: Apr. 24, 2012

(65) Prior Publication Data

US 2012/0265944 A1    Oct. 18, 2012

Related U.S. Application Data

(63) Continuation of application No. 12/787,939, filed on May 26, 2010.

(51) Int. Cl.
 *G06F 12/00*   (2006.01)

(52) U.S. Cl.
 USPC ........... 711/141; 711/146; 711/147; 711/173; 711/205; 711/207

(58) Field of Classification Search
 USPC .................. 711/141, 146, 147, 173, 205, 207
 See application file for complete search history.

(56) References Cited

U.S. PATENT DOCUMENTS

| | | | |
|---|---|---|---|
| 5,644,753 A | 7/1997 | Ebrahim et al. | |
| 6,449,699 B2 | 9/2002 | Franke et al. | |
| 7,500,068 B1 * | 3/2009 | Lenoski et al. | 711/148 |
| 2001/0052054 A1 | 12/2001 | Franke et al. | |
| 2005/0021913 A1 | 1/2005 | Heller, Jr. | |
| 2006/0248286 A1 | 11/2006 | Scott et al. | |
| 2007/0118600 A1 | 5/2007 | Arora | |
| 2009/0006769 A1 | 1/2009 | Blumrich et al. | |
| 2009/0019232 A1 * | 1/2009 | Deshpande et al. | 711/141 |
| 2009/0083493 A1 | 3/2009 | Kinter | |

OTHER PUBLICATIONS

Office Action mailed Sep. 28, 2012 for U.S. Appl. No. 12/787,939; 19 pages.

Response to Office Action filed with the USPTO on Dec. 20, 2012 for U.S. Appl. No. 12/787,939; 8 pages.

(Continued)

*Primary Examiner* — Reginald Bragdon
*Assistant Examiner* — Mehdi Namazi
(74) *Attorney, Agent, or Firm* — Stephen R. Tkacs; Stephen J. Walder, Jr.; Eustus D. Nelson (57) ABSTRACT

A mechanism for assigning memory to on-chip cache coherence domains assigns caches within a processing unit to coherence domains. The mechanism assigns chunks of memory to the coherence domains. The mechanism monitors applications running on cores within the processing unit to identify needs of the applications. The mechanism may then reassign memory chunks to the cache coherence domains based on the needs of the applications running in the coherence domains. When a memory controller receives the cache miss, the memory controller may look up the address in a lookup table that maps memory chunks to cache coherence domains. Snoop requests are sent to caches within the coherence domain. If a cache line is found in a cache within the coherence domain, the cache line is returned to the originating cache by the cache containing the cache line either directly or through the memory controller.

6 Claims, 5 Drawing Sheets

(56) References Cited

OTHER PUBLICATIONS

International Search Report and Written Opinion dated Aug. 23, 2011 for International Application No. PCT/EP2011/057407, 8 pages.

U.S. Appl. No. 12/787,939.

Chaudhuri, Mainak et al., "Cache Coherence Protocol Design for Active Memory Systems", http://www.cse.iitk.ac.in/users/mainakc/pub/pdpta02.pdf/, printed Jul. 9, 2010, 7 pages.

* cited by examiner

ASSIGNING MEMORY TO ON-CHIP COHERENCE DOMAINS

This application is a continuation of application Ser. No. 12/787,939, filed May 26, 2010, status pending.

BACKGROUND

The present application relates generally to an improved data processing apparatus and method and more specifically to mechanisms for assigning memory to on-chip coherence domains.

In computing, cache coherence, also referred to as cache coherency, refers to the consistency of data stored in local caches of a shared resource. When clients in a system maintain caches of a common memory resource, problems may arise with inconsistent data. This is particularly true of processing units in a multiprocessing system. Cache coherence is intended to manage such conflicts and maintain consistency between cache and memory.

A data processing system may include many processing units with many caches. Cache coherence becomes cumbersome as the number of caches grows. Coherence domains partition the caches and memory into domains. Each domain comprises one or more caches and a range of memory. Coherence domains may have varying levels of granularity depending upon the environment.

A coherence domain may contain multiple chips. In some data processing systems, a coherence domain may contain thousands of chips. Many data processing systems today have small coherence domains. Maintaining coherence incurs high overhead. Not every application needs cache coherence.

SUMMARY

In one illustrative embodiment, a method, in a data processing system, is provided for assigning memory to on-chip coherence domains. The method comprises assigning caches on a processing unit chip to a plurality of coherence domains, assigning portions of memory to the plurality of coherence domains, and generating a mapping table, wherein the mapping table associates each portion of memory to an identifier of a coherence domain to which it is assigned.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for assigning memory to on-chip cache coherence domains. The mechanism assigns cores and their associated caches within a processing unit to coherence domains. The mechanism then assigns chunks of memory to the coherence domains. The mechanism monitors applications running on cores within the processing unit to identify needs of the applications. This may be accomplished with a variety of mechanisms, including but not limited to: a change to the operating system such that applications that swap more than other applications (e.g., read data from disk or other secondary storage) will be allocated more memory; or a traffic monitoring hardware component in a very busy memory controller that will raise an exception and request the operating system allocate some of its memory to a less busy memory controller. The mechanism may then reassign memory chunks to the cache coherence domains based on the needs of the applications running in the coherence domains.

When a cache miss occurs, the cache may generate a cache miss. A memory controller receives the cache miss. The memory controller or another unit in which the mapping table is located may look up the address in a lookup table that maps memory chunks to cache coherence domains. Having identified the coherence domain, snoop requests are sent to caches within the coherence domain. Each cache determines if it contains the cache line associated with the address. If a cache contains the cache line associated with the address, it returns the cache line either directly to the originating caches or to the associated memory controller. If a cache line is returned to the memory controller, the memory controller returns the cache line to the originating cache. If a cache line is not found in any cache within the coherence domain, the memory controller accesses the memory to retrieve the cache line and then send the cache line to the originating cache.

Figure 1:
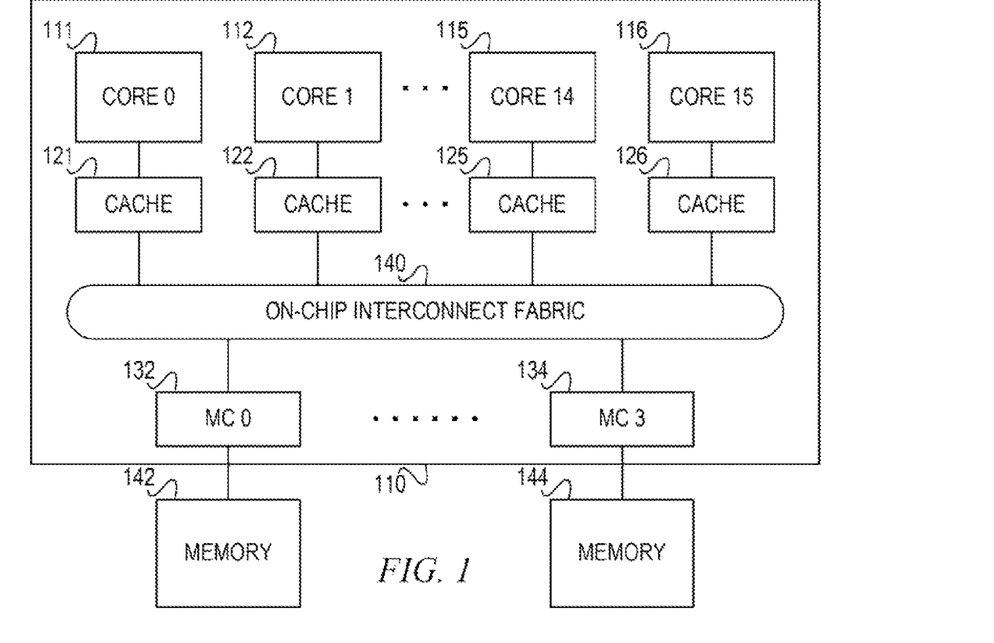
FIG. 1 is a block diagram illustrating an example data processing environment with one coherence domain in accordance with an illustrative embodiment.

FIG. 1 is a block diagram illustrating an example data processing environment with one coherence domain in accordance with an illustrative embodiment. Processing unit 110 comprises sixteen cores (core 0 through core 15) 111-116. Each core 111-116 has a respective cache 121-126. A core and its caches may be referred to as a "chiplet." For example, core 0 111 and cache 121 is one chiplet and core 1 112 and cache 122 is another chiplet. In the example depicted in FIG. 1, processing unit 110 comprises sixteen chiplets. The cores 111-116 and their caches 121-126 communicate with each other and memory controllers 132, 134 via on-chip interconnect fabric 140. Processing unit 110 may have four memory controllers, for example.

While the depicted example shows a processing unit with sixteen cores having sixteen respective caches and four memory controllers (MC 0 through MC 3), the processing unit may comprise more or fewer cores, more or fewer caches, or more or fewer memory controllers. Processing unit 110 may be embodied in one chip. In an alternative embodiment, memory controllers 132, 134 may be off chip.

Memory controllers 132 and 134 provide access to memories 142 and 144, respectively. In one illustrative embodiment, the data processing environment has one coherence domain. Thus, the coherence domain comprises cores 111-116, caches 121-126, and all of memories 142, 144. As each processing unit chip is able to integrate more and more cores, it becomes more and more challenging to keep all caches on a chip coherent, i.e. maintaining one coherence domain per chip. Furthermore, many applications do not require all caches to be kept coherent with memory, which may allow simpler designs that maintain multiple coherence domains on each chip.

Figure 2:
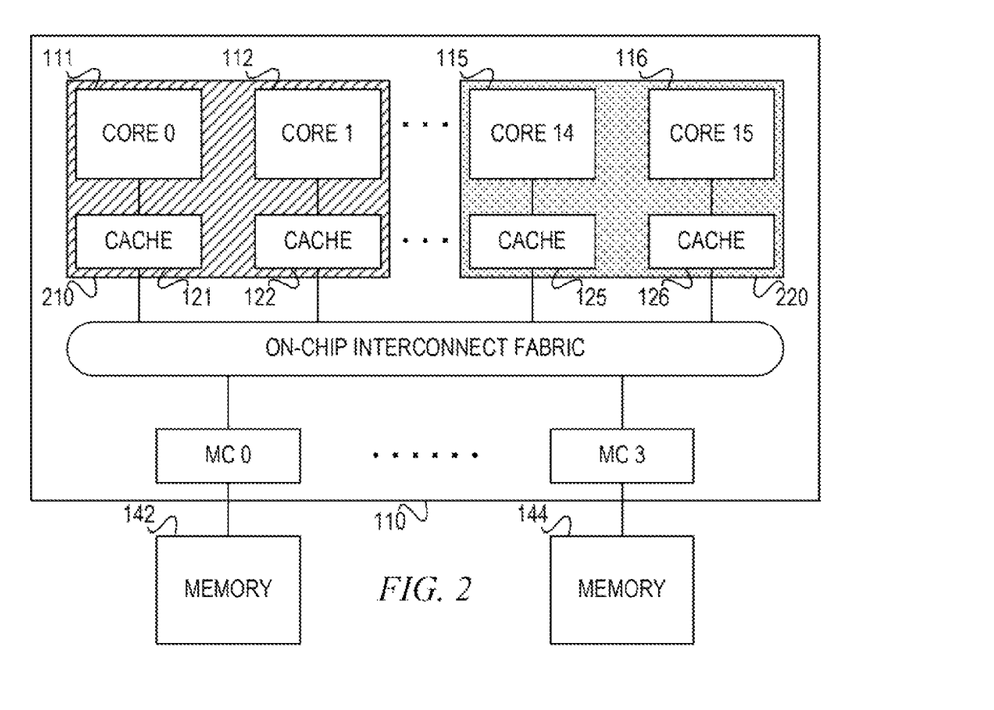
FIG. 2 is a block diagram illustrating an example data processing environment with multiple on-chip coherence domains in accordance with an illustrative embodiment.

FIG. 2 is a block diagram illustrating an example data processing environment with multiple on-chip coherence domains in accordance with an illustrative embodiment. In the depicted example, the data processing environment is divided into eight coherence domains, where each coherence domain comprises two cores with their respective caches. Thus, coherence domain 210 includes cores 111 and 112 and caches 121 and 122, and coherence domain 220 includes cores 115 and 116, and caches 125 and 126. Cores 111 and 112 run applications in coherence domain 210, and cores 115 and 116 run applications in coherence domain 220.

In this example, a mechanism must assign memories 142, 144 to the eight coherence domains, including coherence domain 210 and coherence domain 220. All memory is addressable by all cores.

Figure 3:
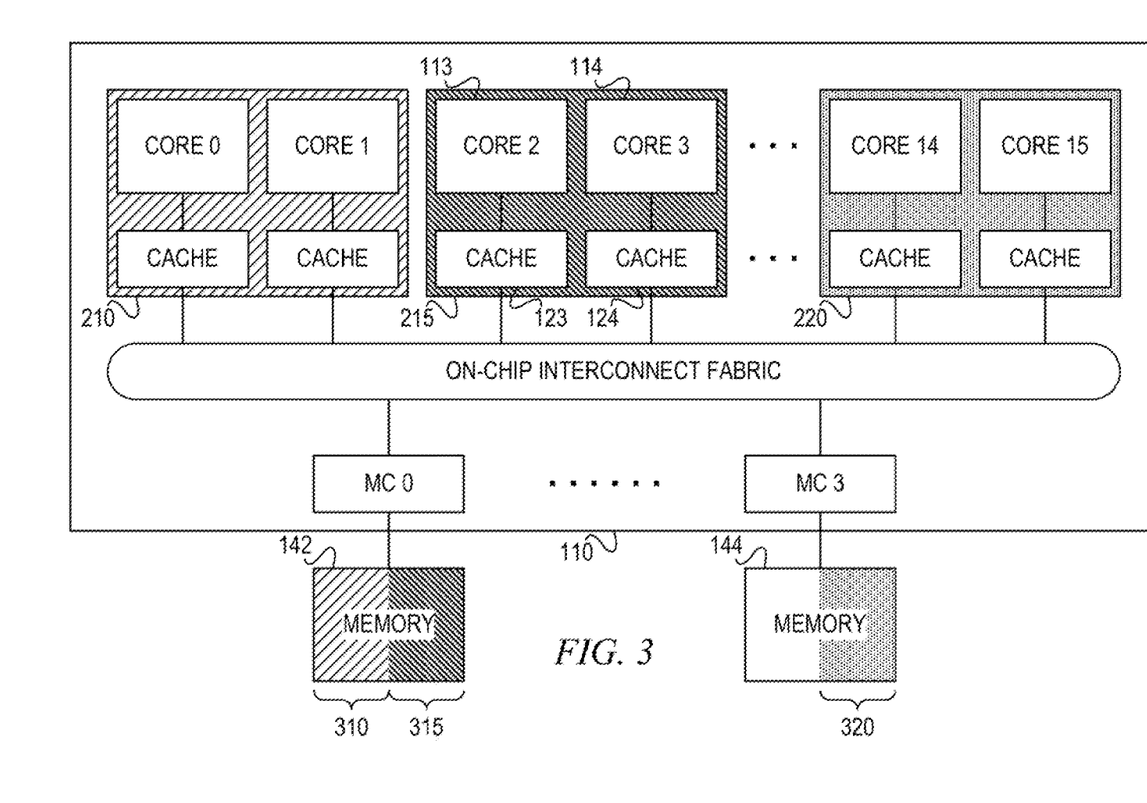
FIG. 3 is a block diagram illustrating an example data processing environment with static mapping of memory to multiple coherence domains in accordance with an illustrative embodiment.

FIG. 3 is a block diagram illustrating an example data processing environment with static mapping of memory to multiple coherence domains in accordance with an illustrative embodiment. This example shows coherence domains 210 and 220, as in FIG. 2, and shows coherence domain 215, which includes caches 123 and 124, which correspond to cores 113 and 114, respectively.

In the depicted example, a mechanism assigns a fixed range of memory to each coherence domain. Thus, each coherence domain gets ⅛ of the addressable memory. As shown, portion 310 of memory 142 is assigned to coherence domain 210, portion 315 of memory 142 is assigned to coherence domain 215, and portion 320 of memory 144 is assigned to coherence domain 220.

In accordance with one illustrative embodiment, a mechanism is provided for dynamically mapping that allows arbitrary assignment of memory to coherence domains. The mechanism assigns memory to coherence domains in fixed size "chunks" (e.g., 256 MB). The mechanism uses a mapping table. Each entry in the mapping table stores the identification of a coherence domain for an associated memory chunk. The mechanism consults one mapping table for each memory access so that the access is sent to the right coherence domain. The mechanism may then snoop caches within that coherence domain. The mapping table may be located in a memory controller, in an on-chip interconnect fabric, in a cache, in an external interface unit, or in another unit that can see memory accesses to a memory controller. The operating system or virtualization layer within the data processing system sets up the mapping tables.

Figure 4:
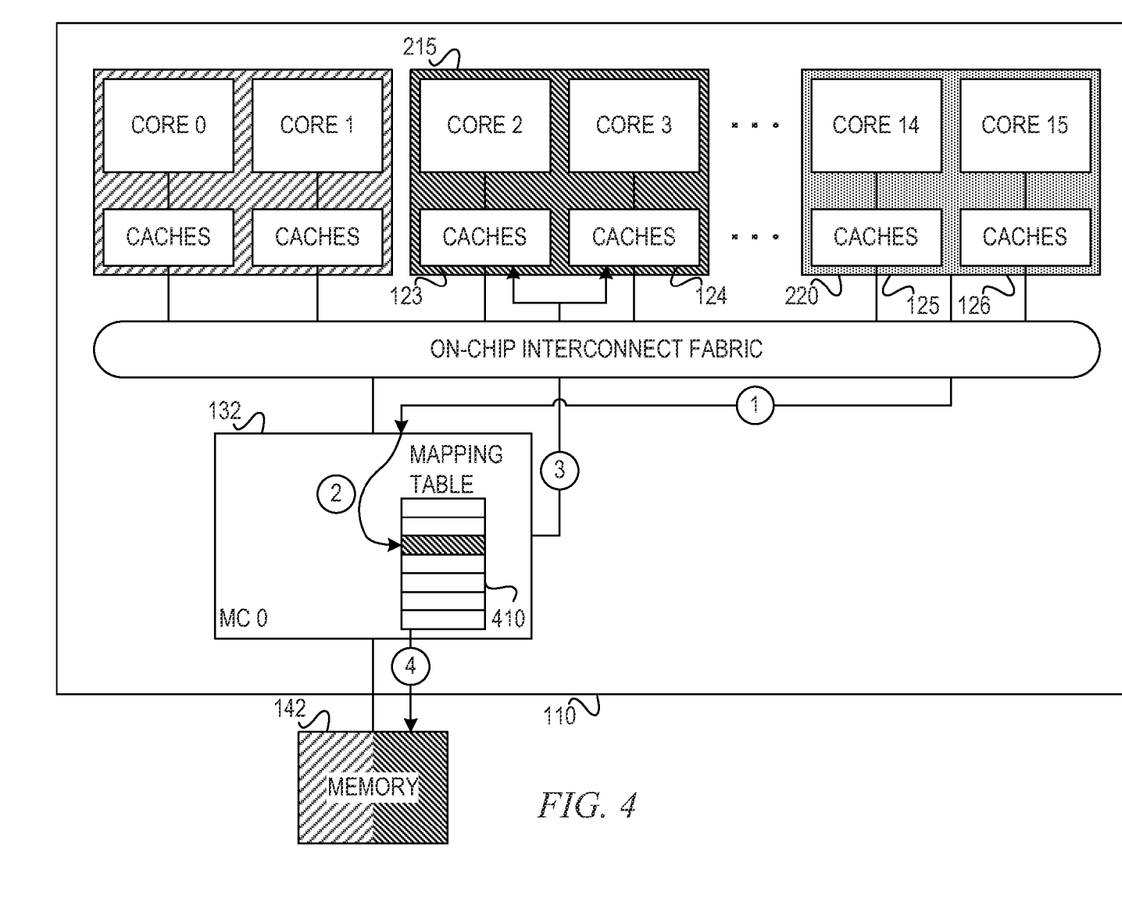
FIG. 4 is a block diagram illustrating an example data processing environment with dynamic mapping of memory to multiple coherence domains in accordance with an illustrative embodiment.

FIG. 4 is a block diagram illustrating an example data processing environment with dynamic mapping of memory to multiple coherence domains in accordance with an illustrative embodiment. The operating system or virtualization component executing in the data processing environment sets up one or more mapping tables, such as mapping table 410 in memory controller 0 132. Each entry in mapping table 410 associates a memory chunk with an identifier of a coherency domain.

In step 1, core 14 or core 15 performs a memory operation that results in a cache miss in one of the caches, caches 125, 126, in coherence domain 220. For example, cache 125 may generate a cache miss. Memory controller 132 receives the cache miss. In step 2, memory controller 132 looks up the memory chunk in mapping table 410 to identify the associated coherence domain. Memory controller 132 determines that the memory chunk being accessed is in coherence domain 215.

Then, in step 3, memory controller 132 sends a request to snoop caches 123, 124 in coherence domain 215. Caches 123, 124 determine a response to the snoop as known in the art. For example, cache 123 may locate the cache line, determine that it is labeled "dirty," meaning the data in the cache line has been changed, change the label to "valid," and return the cache line to cache 125 or memory controller 132. In the latter case, memory controller 132 would return the cache line to cache 125 in the above example.

Alternatively, caches 123, 124 may determine that the cache line is not present and indicate such in the response to the snoop. In this case, in step 4, memory controller 132 accesses memory 142 and returns the cache line to cache 125 in the above example. In an alternative embodiment, memory controller 132 may begin to access memory 142 in parallel with snooping the caches of the identified coherence domain. Thus, if the snoop does not result in data being returned, memory controller 132 will already have begun the memory access.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
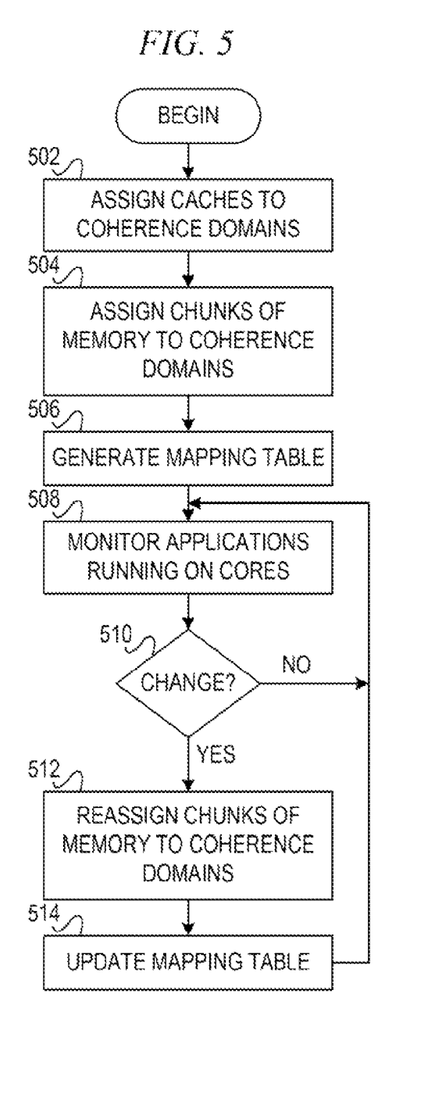
FIG. 5 is a flowchart illustrating operation of a mechanism for assigning memory to on-chip cache coherence domains in accordance with an illustrative embodiment.

FIG. 5 is a flowchart illustrating operation of a mechanism for assigning memory to on-chip cache coherence domains in accordance with an illustrative embodiment. The mechanism may be embodied in the operating system or virtualization component within the data processing environment, for example. Operation begins, and the mechanism assigns caches on a processing unit chip to coherence domains (block 502). The mechanism then assigns chunks of memory to the coherence domains (block 504). The chunks of memory may be fixed sized portions of memory, for example 256 MB chunks of memory. The mechanism generates one or more mapping tables to map the chunks of memory to coherence domains (block 506).

In accordance with the illustrative embodiment, the mechanism then monitors applications running on the cores of the processing unit chip to determine memory usage by the cores in the coherence domains (block 508) using a method similar to that previously described or some other appropriate method. The mechanism determines whether the memory usage of the applications warrants a change in assignment of memory to the coherence domains (block 510). If the mechanism determines that the needs of the applications do not warrant a change in mapping, then operation returns to block 508 to monitor the applications.

If the mechanism determines that the memory usage of applications running on the cores of the coherence domains warrants a change in mapping in block 510, then the mechanism reassigns chunks of memory to the coherence domains (block 512). The mechanism updates mapping tables within the processing unit to reflect the change of assignment (block 514). Thereafter, operation returns to block 508 to monitor applications. In another embodiment, not all memory chunks are assigned to a coherence domain in block 504. Coherence domains may issue a request for unassigned memory chunks in block 510.

Figure 6:
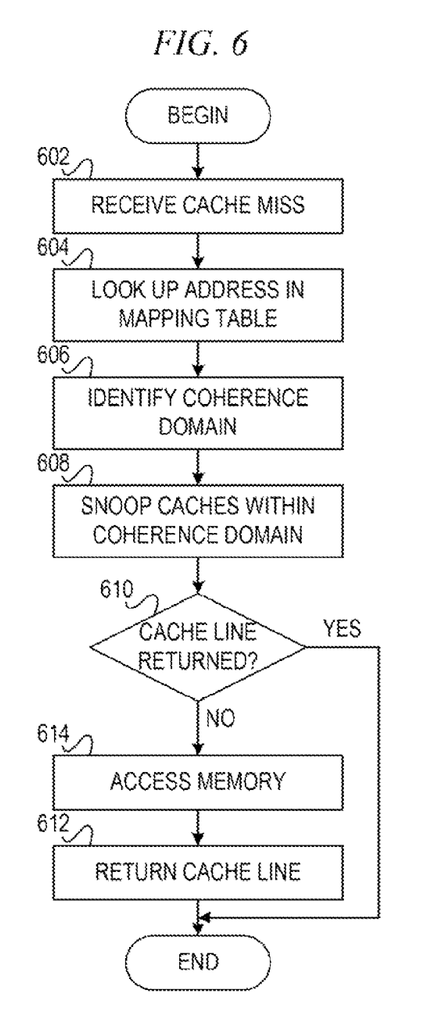
FIG. 6 is a flowchart illustrating operation of a memory controller handling a cache miss with dynamically assigned coherence domains in accordance with an illustrative embodiment.

FIG. 6 is a flowchart illustrating operation of a memory controller handling a cache miss with dynamically assigned coherence domains in accordance with an illustrative embodiment. Operation begins, and the memory controller receives a cache miss (block 602). The memory controller looks up the address in a mapping table (block 604). The memory controller identifies a coherency domain corresponding to the memory chunk to which the address belongs (block 606). Then, the memory controller sends a request to snoop the caches within the identified coherence domain (block 608).

The memory controller determines whether one of the caches in the coherence domain returns a cache line (block 610) to the originating cache. If a cache returns a cache line, then operation ends. If a cache does not return a cache line in block 610, then the memory controller accesses the memory (block 614) and returns the cache line to the cache that generated the cache miss (block 612). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
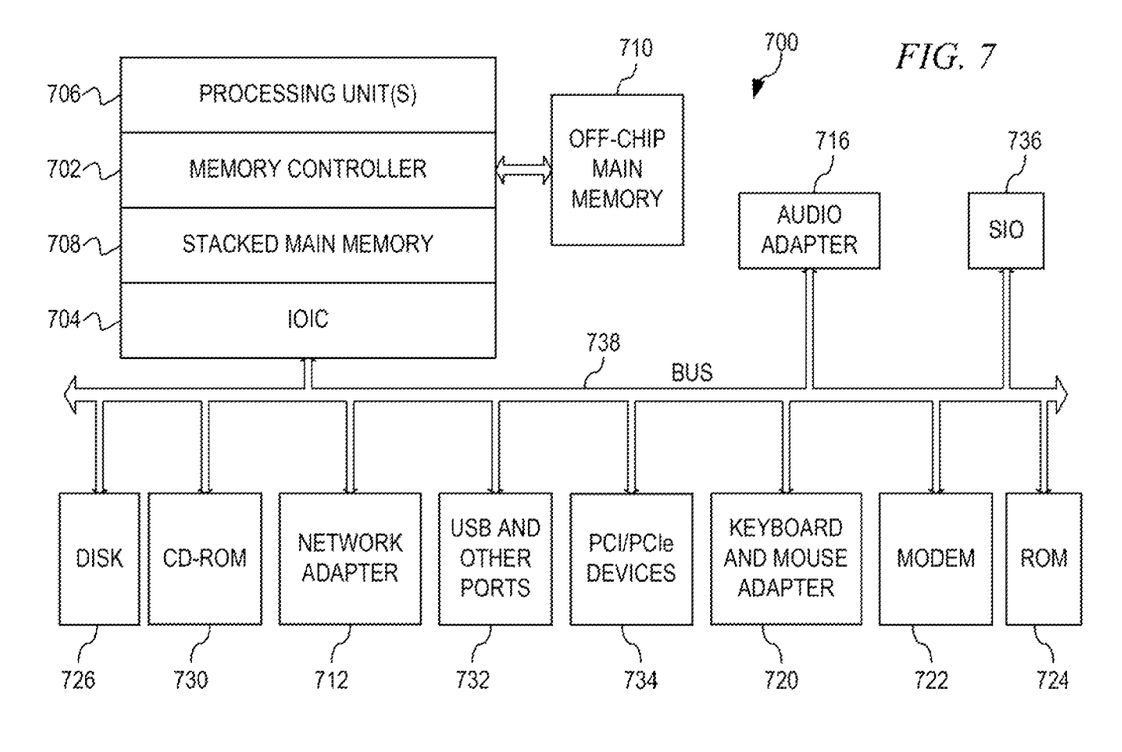
FIG. 7 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIG. 7 is provided hereafter as an example environment in which aspects of the illustrative embodiments may be implemented. While the description following FIG. 7 will focus primarily on a single data processing device implementation, this is only an example and is not intended to state or imply any limitation with regard to the features of the present invention. To the contrary, the illustrative embodiments are intended to include distributed data processing environments.

FIG. 7 is a block diagram of an example data processing system in which aspects of the illustrative embodiments may be implemented. Data processing system 700 is an example of a computer in which computer usable code or instructions may be located. In the depicted example, data processing system 700 employs a 3D chip architecture including processing unit(s) 706, on-chip memory controller(s) 702, stacked main memory 708, on-chip input/output and interconnect controller (IOIC) 704, and external main memory 710.

Processing unit(s) 706 may be processing cores 111-116 in FIGS. 1-4, for example. On-chip main memory 708 and off-chip main memory 710 may be a shared memory that is shared among a plurality of processing units. That is, on-chip main memory 708 and off-chip main memory 710 may be a higher level of memory that supplements the memory in each processing unit 706. Stacked main memory 708 and off-chip main memory 710 may be main memory 142 and 144 in FIGS. 1-4, for example.

In the depicted example, local area network (LAN) adapter 712 connects to IOIC 704 through bus 738. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to IOIC 704 through bus 738. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to IOIC 704 through bus 738. HDD 726 and CD-ROM drive 730 may use, for example, an integrated drive electronics (IDE) or serial advanced technology attachment (SATA) interface. Super I/O (SIO) device 736 may be connected to IOIC 704.

An operating system runs on processing unit 706. The operating system coordinates and provides control of various components within the data processing system 700 in FIG. 7. As a client, the operating system may be a commercially available operating system such as Microsoft® Windows®XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 700 (Java is a trademark of Sun Microsystems, Inc. in the United States, other countries, or both).

As a server, data processing system 700 may be, for example, an IBM®eServer™ System p® computer system, running the Advanced Interactive Executive (AIX®) operating system or the LINUX®operating system (eServer, System p, and AIX are trademarks of International Business Machines Corporation in the United States, other countries, or both while LINUX is a trademark of Linus Torvalds in the United States, other countries, or both). Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, on-chip main memory 708, off-chip main memory 710, ROM 724, or in one or more peripheral devices 726 and 730, for example.

A bus system, such as bus 738 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, on-chip main memory 708, off-chip main memory 710, ROM 724, or a cache such as found in on-chip memory controller 702 in FIG. 7.

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device which is configured with flash memory to provide non-volatile memory for storing operating system files and/or user-generated data, for example. Essentially, data processing system 700 may be any known or later developed data processing system without architectural limitation.

Thus, the illustrative embodiments provide a mechanism for assigning memory to on-chip cache coherence domains. The mechanism assigns caches within a processing unit to coherence domains. The mechanism then assigns chunks of memory to the coherence domains. The mechanism monitors applications running on cores within the processing unit to identify needs of the applications. The mechanism may then reassign memory chunks to the cache coherence domains based on the needs of the applications running in the coherence domains.

When a cache miss occurs, the cache may generate a cache miss. A memory controller receives the cache miss. The memory controller may look up the address in a lookup table that maps memory chunks to cache coherence domains. Having identified the coherence domain, the memory controller sends requests to snoop caches within the coherence domain. If a cache line is found in a cache within the coherence domain, the cache line is returned to the originating cache by the cache that provide the cache line either directly or through the memory controller. If a cache line is not found in a cache within the coherence domain, the memory controller accesses the memory to retrieve the cache line and then return the cache line to the originating cache.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a data processing system, for assigning memory to on-chip coherence domains, the method comprising:
   assigning caches on a processing unit chip to a plurality of coherence domains;
   assigning portions of memory to the plurality of coherence domains;
   generating a mapping table, wherein the mapping table associates each portion of memory to an identifier of a coherence domain to which it is assigned;
   responsive to a cache generating a cache miss, looking up an address of the cache miss in the mapping table to identify a coherence domain; and
   snooping caches within the identified coherence domain.

2. The method of claim 1, further comprising:
   monitoring applications running on processing cores in the processing unit chip to determine memory usage by the applications; and
   reassigning the portions of memory to the plurality of coherence domains based on the determined memory usage by the applications.

3. The method of claim 2, further comprising:
   updating the mapping table to reflect the reassignment portions of memory to the plurality of coherence domains.

4. The method of claim 1, wherein the portions of memory are fixed sized ranges of memory.

5. The method of claim 1, further comprising:
   responsive to a snoop request, a cache in the identified coherence domain returning a cache line to the cache that generated the cache miss.

6. The method of claim 1, further comprising:
   accessing a portion of memory corresponding to the cache miss to receive a cache line; and
   returning the cache line to the cache that generated the cache miss.

* * * * *